United States Patent
Mathur (10) Patent No.: US 12,205,618 B2
(45) Date of Patent: Jan. 21, 2025

(54) CONTEXT-BASED MEDIA INDEXING

(71) Applicant: Avid Technology, Inc., Burlington, MA (US)

(72) Inventor: Shailendra Mathur, Beaconsfield (CA)

(73) Assignee: Avid Technology, Inc., Burlington, MA (US)

(*) Notice: Subject to any disclaimer, the term of this patent is extended or adjusted under 35 U.S.C. 154(b) by 181 days.

(21) Appl. No.: 18/171,157

(22) Filed: Feb. 17, 2023

(65) Prior Publication Data

US 2023/0238035 A1 Jul. 27, 2023

Related U.S. Application Data

(63) Continuation of application No. 17/331,334, filed on May 26, 2021, now Pat. No. 11,615,817.

(51) Int. Cl.
*G11B 27/10* (2006.01)
*G06F 9/54* (2006.01)
*G11B 20/00* (2006.01)
*G11B 27/00* (2006.01)

(52) U.S. Cl.
CPC ............... *G11B 27/10* (2013.01); *G06F 9/541* (2013.01); *G11B 20/00007* (2013.01); *G11B 2020/00014* (2013.01); *G11B 2020/00072* (2013.01)

(58) Field of Classification Search
CPC ... G11B 27/10; G11B 27/00; G11B 20/00007; G11B 2020/00014; G11B 2020/00072; G06F 9/541
USPC ........................................ 386/270, 271, 282
See application file for complete search history.

(56) References Cited

U.S. PATENT DOCUMENTS

2021/0097643 A1* 4/2021 Imbrogno ............... G06T 15/04

* cited by examiner

*Primary Examiner* — Daquan Zhao
(74) *Attorney, Agent, or Firm* — Oliver Strimpel (57) ABSTRACT

Indexing of media sources available to media composition applications, such as video editing applications and digital audio workstations, is extended to sources of an arbitrary type, including non-file type sources. Examples of such sources include devices using baseband video and audio protocols, network ports and physical devices connected via USB, Thunderbolt, etc. The sources are discovered and indexed even when not previously known to the application with the result that any available bitstream becomes available to the application. Applications access the sources via feeders, which are addressable portals through which media essence is received. The indexing methods involve the instantiation of a hierarchy of plug-in software modules by a format-handling subsystem of the application or by a media indexing service servicing one or more applications.

24 Claims, 8 Drawing Sheets

CONTEXT-BASED MEDIA INDEXING

CROSS-REFERENCE TO RELATED APPLICATION

This application claims priority to and the benefit of, under 35 U.S.C. § 120, and is a continuing application of pending U.S. application Ser. No. 17/331,334, filed May 26, 2021, which is incorporated herein by reference.

BACKGROUND

When creating a media composition, editors use media composition applications that draw upon source media as material that is used as the basis for the composition. For a movie, such source material may be material shot on a set or on location. For a news program, it may be video captured at the site of breaking news, as well as background or "B Roll" material. The media composition application can only use material as a constituent of a media composition when it has knowledge of it, i.e., when it can access information that tells the application of the existence of the source, as well as information about the source. Such information consists of metadata that is stored in association with the media, or in some cases as an integral part of it.

In existing systems, the media and the metadata are stored in files, and the media composition application is provided with a file path that specifies the location of the file, whether on local storage, shared storage, a remote server, or in the cloud. The composition application creates a media index of the source material by accessing the media files and using specific knowledge as to the format of the file and its metadata. This information enables the composition application to extract metadata that includes structural and descriptive information about the media, including its quality. Generally, the application generates the media index by searching for media files only in certain predetermined specific locations within a file structure on disk.

In present-day media storage and editing environments, users need to determine the availability and quality of all available media, including media that may not be in a file of a particular format or stored at a pre-specified location. There is therefore a need for media indexing of all available sources without the limitation requiring media to be stored as files in specified locations.

SUMMARY

In general, media indexing is extended to include sources of an arbitrary type. The source types are not limited to files. A plug-in architecture enables the metadata and media quality information required to index a media source to be accessed via an API, even in the absence of actual media essence.

In general, in one aspect, a method of indexing media sources available to at least one of a media composition application and a media indexing service comprises: receiving a specification of a first type of feeder over which media essence is to be received, wherein the specification is received when one of: a change notification is received from a source monitoring service; a user requests content via the media composition application; and the media indexing service for the media composition application is launched; and in response to receiving the specification of the first type of feeder over which media essence is to be received, wherein the first feeder type is not a file type: performing an application program interface (API) call to a software plug-in module adapted to an attribute of a data stream to be received via the feeder of the first type, wherein the software plug-in module returns to at least one of the media composition application and the media indexing service a handle that enables the feeder of the first type to be accessed by the media composition application.

Various embodiments include one or more of the following features. Performing the API call to the software plug-in module causes metadata about content to be received via the feeder of the first type to be returned to at least one of the media composition application and the media indexing service. The metadata is extracted by the software plug-in module. The metadata of the first feeder type is determined by the software plug-in module. The metadata defines a technical quality of media content to be received via the feeder of the first type. The metadata of the feeder of the first type specifies a type of media essence, a synchronization, and an encoding type, and further comprising: executing a bitstream plug-in software module that: parses a stream of data received from the feeder of the first type; indexes at least one of video frames, audio samples, ancillary data and metadata present within the stream of data; determines a decoding method; and executing a decoding plug-in software module corresponding to the determined decoding method, wherein the decoding plug-in software module: decodes the at least one of the video frames, audio samples, ancillary data and metadata present within the stream of data; and sends the decoded at least one of the video frames, audio samples, and ancillary data to a media player of the media composition application. The decoded at least one of the video frames, audio samples, and ancillary data are sent upon receipt of a request from a media player application. The metadata defines an element type of media content to be received via the feeder of the first type. Storing the handle as a media source entry in a database of media sources available to the media composition application. The database of media sources is stored by the media indexing service. The database of media sources is stored by the media composition application. The database of media sources includes a given media source representing a given content that is available in a plurality of different technical qualities. The user requests content via the media composition application, and the media composition application creates a master clip for a media source containing the requested content, and wherein the master clip is visible to the user and includes references to the given media source in each of the plurality of different technical qualities. The given media source is available in a first technical quality via a feeder of a first type and in a second technical quality different from the first technical quality via a feeder of a second type. The attribute of the data stream to be received via the feeder of the first type is a protocol type deployed by the data stream. The attribute of the data stream to be received via the feeder of the first type is a metadata type contained within the data stream. The attribute of the data stream to be received via the feeder of the first type is a channel type present within the data stream. The feeder of the first type is one of a plurality of feeders and an arrangement of the plurality of feeders is specified by a volume plug-in software module. The volume plug-in software module associates a channel label with content to be received via each of the plurality of feeders. The feeder type is one of an SDI feeder type, and IP feeder type, and a USB feeder type. The feeder type is one of a blob storage feeder type, a cloud storage feeder type and a remote FTP server feeder type. The feeder type is one of uniform resource identifier and a uniform resource locator. In response to receiving the specification of the first type of feeder over which metadata and media essence corresponding to a media source is to be received: locating in a plug-in registry of the media composition application an entry corresponding to the feeder of the first type; and using information contained within the entry to instantiate and execute a copy of a feeder plug-in of the first type. In response to launching the media indexing service: populating a registry within a format-handling subsystem of the media indexing service with a set of feeder types over which media source metadata and media essence may be received; and receiving and instantiating a copy of a software plug-in module corresponding to each feeder type of the set of feeder types. The source monitoring service is implemented by the media composition application. The source monitoring service is implemented by the media indexing service. The data stream to be received via the feeder of the first type is not yet available.

In general, in another aspect, a computer program product comprises: a non-transitory computer-readable medium with computer-readable instructions encoded thereon, wherein the computer-readable instructions, when processed by a processing device instruct the processing device to perform a method of indexing media sources available to at least one of a media composition application and a media indexing service, the method comprising: receiving a specification of a first type of feeder over which media essence is to be received, wherein the specification is received when one of: a change notification is received from a source monitoring service; a user requests content via the media composition application; and the media indexing service for the media composition application is launched; and in response to receiving the specification of the first type of feeder over which media essence is to be received, wherein the first feeder type is not a file type: performing an application program interface (API) call to a software plug-in module adapted to an attribute of a data stream to be received via the feeder of the first type, wherein the software plug-in module returns to at least one of the media composition application and the media indexing service a handle that enables the feeder of the first type to be accessed by the media composition application.

In general, in a further aspect, a system comprises: a memory for storing computer-readable instructions; and a processor connected to the memory, wherein the processor, when executing the computer-readable instructions, causes the system to perform a method of indexing media sources available to at least one of a media composition application and a media indexing service, the method comprising: receiving a specification of a first type of feeder over which media essence is to be received, wherein the specification is received when one of: a change notification is received from a source monitoring service; a user requests content via the media composition application; and the media indexing service for the media composition application is launched; and in response to receiving the specification of the first type of feeder over which media essence is to be received, wherein the first feeder type is not a file type: performing an application program interface (API) call to a software plug-in module adapted to an attribute of a data stream to be received via the feeder of the first type, wherein the software plug-in module returns to at least one of the media composition application and the media indexing service a handle that enables the feeder of the first type to be accessed by the media composition application.

DETAILED DESCRIPTION

Media indexing is extended to any type of source, including non-file source types that have not hitherto been considered amendable to indexing. The process involves discovering and indexing such sources, even when they are not previously known to the application that consumes those sources. With the ability to index any source, including, but not limited to files, media editors have unified access to all sources of media available to them. As used herein, the context referred to by "context-based media indexing" is the context of the media source. In prior art media indexers, all indexing was performed on media sources in the form of files, i.e., only a single, file-based context was accommodated. The methods described herein expand media indexing to include media sources that are not in files but exist in one of a set of different contexts, which are described below. The result is that any available bitstream may be indexed and their samples decoded.

The media indexing methods described herein are used both by a media composition application, with which the user interacts when creating or editing a media composition, and a media indexing service to which the media composition application has access. In typical use cases, the media composition application is hosted on a system local to the user, and the media indexing service is hosted on another system, which may also be local to the user and connected to it via a local area network, or it may be remote from the user, or implemented in the cloud. We describe the relevant components of the media composition application and the media indexer below.

As used herein, the term "source" is an application-level concept that refers to one or more copies of the same media essence, each copy having a different quality. Media essence quality is specified by parameters such as the spatial resolution, frame or sample rate, and bit depth. Thus, as used herein, media quality refers to the technical quality of the media, rather than to a qualitative assessment of content the media contains. Metadata sufficient to resolve the various sources and their copies are indexed in a source database within the media composition application and/or within the media indexing service. A source is identified by its source ID, which is an identifier that uniquely defines its content. As an example, the content may be a particular video take of a particular scene. When copies of a source exist at different qualities, each of these copies may be received via a different portal (corresponding to a feeder, defined below) from one or more external media devices. Thus, specifying a particular source does not necessarily mean specifying a particular media device from which the source originates, and does not denote a transport mechanism or the nature of the device.

Sources denote content, which is generally searchable by a user. A general expression for a source is:

$$source_A = (essence_A, quality_1), (essence_A, quality_2), \ldots$$

where the essence is labeled by a source identifier, i.e., $source_A$ and $essence_A$ are uniquely labelled by source-identifier$_A$.

As used herein the term "feeder" refers to a portal that is addressable by the application through which media essence may be accessed. A feeder is characterized by its type and is accessed via a feeder handle that is available to the application. The feeder type does not constrain the content or otherwise define what is being transported via the feeder. A feeder of a given type may be a portal for data received from any devices that support feeders of the given type. For example, a Serial Digital Interface (SDI) feeder (i.e., a feeder of the SDI type) may carry data from a camera or from a tape deck. The data may include media essence or metadata pertaining to a particular source. The data output by a given external media device such as a camera or a tape deck, may be accessed via a single feeder or via multiple feeders. For example, the 4K video from a given camera may be accessed via a file system feeder, the HD video from the camera may be accessed via an SDI feeder, a proxy-quality video accessed via an Internet Protocol (IP) feeder, and the metadata accessed via a Universal Serial Bus (USB) feeder. The essence obtained via the different feeders are grouped together as sharing the same media essence by means of the source identifier mentioned above. With existing indexers, each of these three media sources are captured to disk as separate files and the quality information is written into the metadata of each of the files. By contrast, when using the indexing methods described herein, the creation of files is not required. Instead, the indexer is able to access a stream directly, for example at an HD SDI port or an SD SDI port, determine whether media samples are available, determine the quality of the media samples, and also ascertain a route by which the samples of the desired quality may be obtained, such as a URI or a transport stream handler. In the prior art media indexers that are only able to index files, the route necessarily consists of a file path, and the media quality or samples of the media may not be retrieved until at the file is at least partially, if not the fully received and written to the storage medium.

As used herein, the term "channel" refers to an application-level concept that specifies the role of a particular essence within a media composition. A given channel may be available via more than one feeder. Alternatively, multiple channels may be received via a single feeder, as is the case with Composite Video signals. For example, a video composition may have three channels: video, left audio, right audio, or 8 channels in a 7.1 mix. An audio composition may have 100 channels, one for each instrument of an orchestra.

As used herein, the term "volume," refers to a standardized logical grouping of feeders. Optionally, the volume may have metadata (e.g., specifying quality) associated with media associated with the respective feeders. The terms "media device" and "external device" refer to a physically distinct entity that is in data communication with and provides media and metadata to a media composition application or a media indexing service. It may be a hardware device, such as a camera, hard disk, or tape deck, or it may provide data from a connection to a wide area network, blob storage, cloud storage, or a remote File Transfer Protocol (FTP) server. A media composition application is one that enables a user to create a new media composition or edit an existing media composition. Media composition applications include video editing applications, such as Media Composer® from Avid Technology, Inc. of Burlington, Massachusetts, and digital audio workstations such as Pro Tools®, also from Avid Technology, Inc.

As used herein, the term "master clip" refers to an entry in a source database of a media composition application. A master clip is created when a user of a media composition application specifies a volume or feeder type for a new source of a particular quality during an explicit media ingest process. Once created for a new quality, new qualities of content originating from the same source are typically registered under the same master clip. In some applications a different master clip entry may be created for different qualities, however they share a common source ID indicating that these qualities come from the same source. Master clips may also be created together with their source ID before any ingest process as part of a logging process. The source ID is then used to create an association with the essence for the source when it actually become available. Each master clip contains a set of resolvable handles, metadata specifying the quality of the media essence associated with the handle, an element type, as well as other descriptive and structural metadata. The quality information as well as the other metadata is available to the user, who uses it to determine whether and how to include a reference to the master clip within the media composition they are creating. The essence corresponding to various qualities associated with the master clip may comprise video frames, audio samples, ancillary data, or other media and data content that is utilized by the composition application. In some applications, a visual representation of the master clip is provided in a view called a Bin or a source database view. This visual representation provides a method for the user the view the metadata, a name, and optionally a pictorial representation of what the source contains. The visual representation of the source is also used by the user of the composition application to make an edit or mixing decision using that source with respect to other sources irrespective of the quality of the content. In some cases, the master clip can be used in the composition by user to perform editing decisions even without the essence being present, simply by relying on the metadata. For example, the spatial bounding boxes metadata can be used to place graphical images with respect to each other in a composited composition or in a graphics authoring system. In another example, the metadata representing the temporal audio and video spans of a source can be used to be used to create a temporal arrangement of the media in an audio or video timeline based video editing system or digital audio workstation.

The following is an exemplary list of external devices that are indexable using the described methods. A more comprehensive list of external device types (referred to below as feeder types) and their associated protocols is listed below.

Figure 3A:
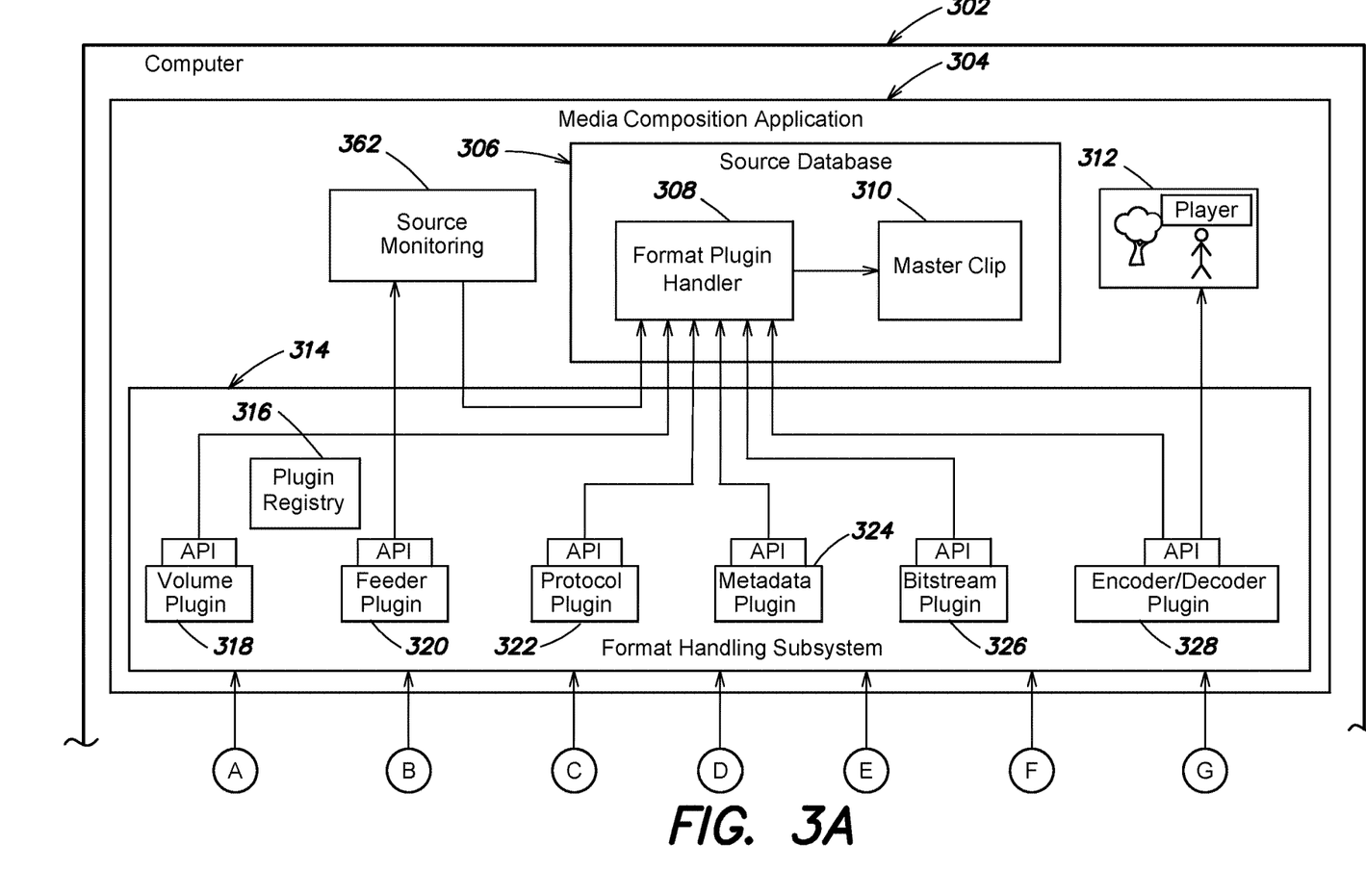
FIGS. 3A and 3B are high-level block diagrams showing components of a media composition application using the described context-based media indexing methods with a range of external media devices that act as media sources.
Figure 3B:
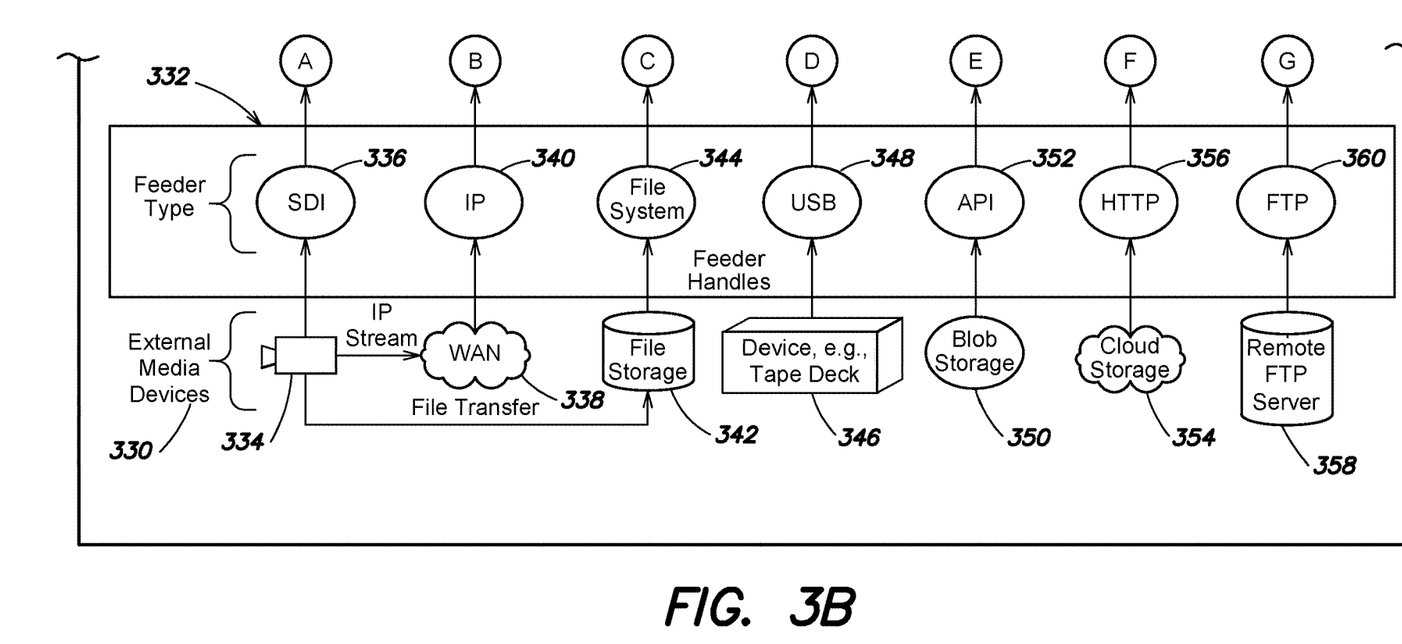

(i) Input/output hardware that uses baseband video and audio protocols, such as SDI or SMPTE 2210 (FIG. 3B, 334).

(ii) Network ports (FIG. 3B, 338), including: (a) baseband network streams such as compressed streams (e.g., Sony LLVC and TICO) and streams having various protocols (e.g., SMPTE 2110 and SMPTE 2022-6); (b) IP streams (e.g., SRT, NDI, MPEG-2 TS, and LiveU); and (c) files that are growing, i.e., whose media essence is still being written to storage before a full file is created.

(iii) Physical devices (FIG. 3B, 346) such as removable media transport devices and Webcams connected through USB, Thunderbolt, or other connection types.

(iv) Object storage accessed through object APIs (FIG. 3B, 350) such as S3 API from Amazon.com®, Inc. and Azure® Blob API.

(v) Sources for which the specification of location is not dependent on a path within a file system but is based on a resolvable URI or URL, such as a file residing on a remote storage server, accessed by means of HTTP calls (FIG. 3B, 354).

(vi) Remote FTP Server (FIG. 3B, 358).

The indexable external media devices also include file storage (FIG. 3B, 342), which has hitherto been the sole device context and type that have been indexable by media indexers. Using the methods described herein, a media composition application is able to use heterogeneous source types, such as those listed above, in a transparent fashion with the same ease with which prior art media indexers facilitated the use of media files.

Figure 1A:
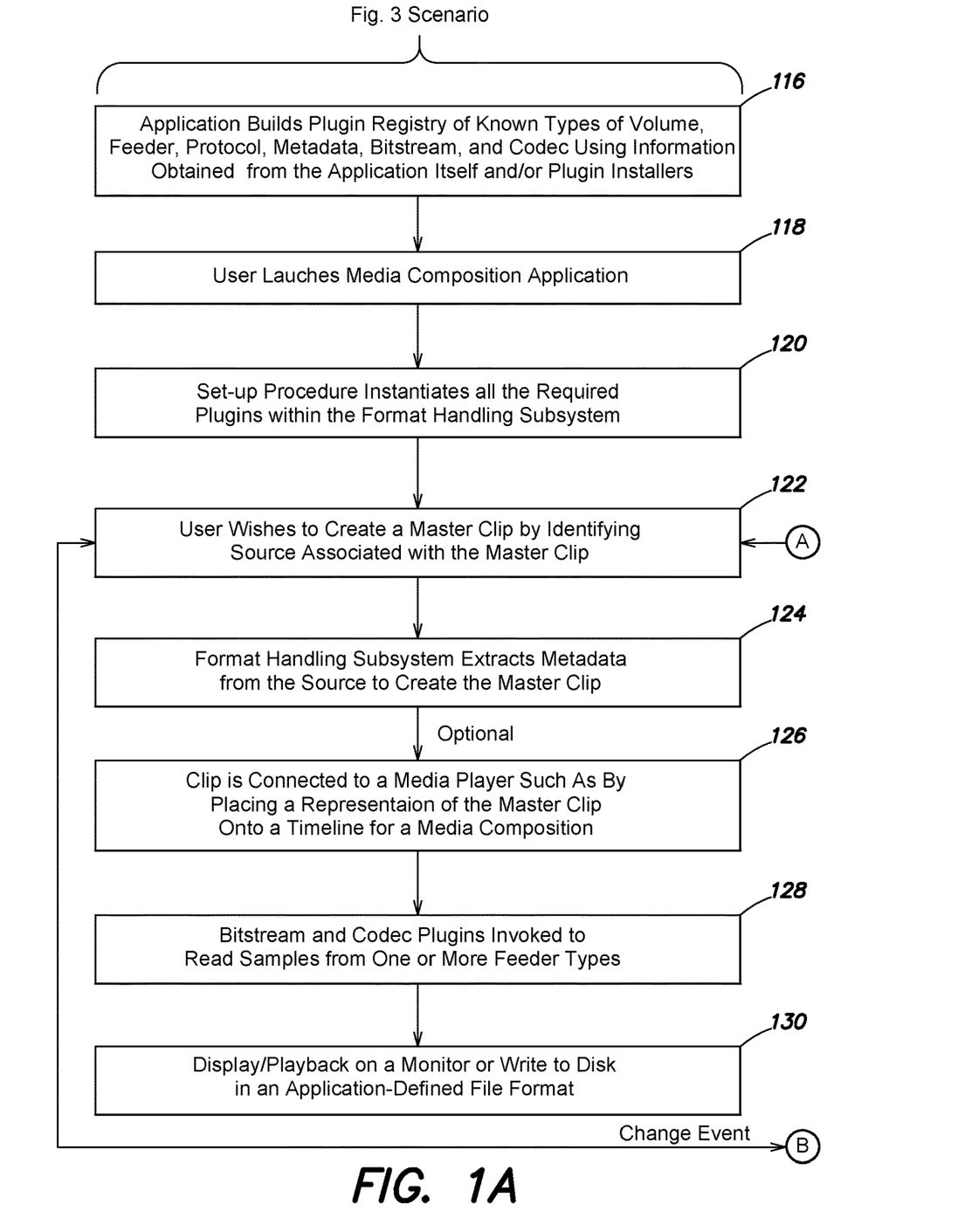
FIGS. 1A and 1B are high-level flow diagrams showing steps involved in context-based media indexing.
Figure 1B:
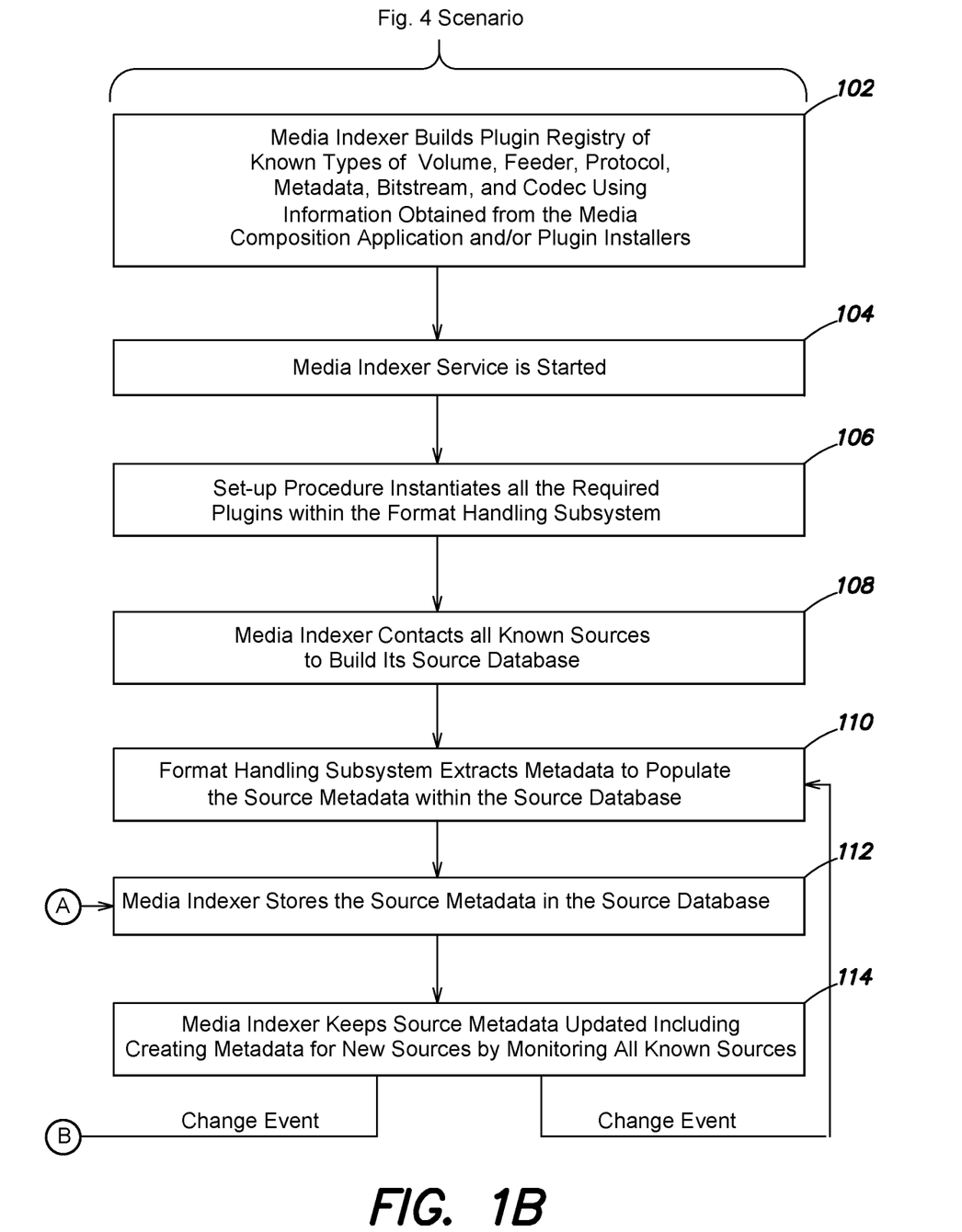

The various steps involved in context-based media indexing are shown in the high-level flow diagrams of FIGS. 1A and 1B. We describe the actions of the media indexer first, and then those of the media composition application. A high-level block diagram of the media indexer will be described below in connection with FIGS. 4A and 4B. The media indexer populates a central plug-in registry within its format-handling subsystem with the known types of the entities that describe and enable access to the various media sources. These include the known types of volume, feeder, protocol, metadata, bitstream, and codec. It does this using information obtained from the media composition application and/or from plug-in installers (102). As used herein, plug-ins refer to software modules that interact with a host application via an application program interface (API). In various embodiments the plug-in registry includes a watch mechanism enabling it to dynamically update the set of registered entities as new plug-ins for new volume, feeders, protocols, metadata, bitstream or encoders/decoders become available. As with the other sources, before a new source can be used, the required plug-ins need to be instantiated. For each registered plug-in, the plug-in registry contains an identifier for the plug-in, as well as a location of a software package containing the executable code for the plug-in. This can be stored locally or remotely.

Next the media indexer service is started (104). This triggers a set-up procedure which instantiates all the required plug-ins within a format-handling subsystem of the media indexer (106). The set-up procedure is described in detail below in connection with FIGS. 2A and 2B. Once the required plug-ins are instantiated, the media indexer uses the plug-ins to gather information about the known sources connected to the feeders, and uses information obtained through the plug-ins about the content provided from the sources to build its source database (108). This involves using a format-handling subsystem of the media indexer to extract metadata from the plug-ins and using this data to populate the source metadata fields within the source database (110). The source metadata obtained is stored in a source database of the media indexer (112). All essence received via the various feeder plug-ins from a given source share a common source ID and timecode stored in the media indexer database. This enables the system to tie the multiple feeders having different quality information to their common source when the application queries the media indexer for information about that source. The source ID is returned by the format-handling subsystem. The media indexer continues to monitor all known sources, creating new database entries for new content that becomes available, or removing database entries for sources that are no longer available (114). The format-handling subsystem keeps the source metadata of the source database updated with any detected changes for content available in the sources connected to the feeder. Changes detected by the ongoing monitoring include changes in attributes of the content being received via the feeders such as the content quality, and changes in the availability of the content. The changes include indications of new content becoming available from the a given connected source, in which case the source ID is updated to distinguish it from previous content that may have been captured from this source. This monitoring is performed by software modules executing within both the media composition application and the media indexing service. The monitoring module receives the change notifications from the feeder plug-in.

We now describe the actions of the media composition application. In a manner analogous to that of the media indexer, the media composition application populates its own plug-in registry with the IDs and source code locations for the plug-ins for the known types of volume, feeder, protocol, metadata, bitstream, and codec using information obtained from the application itself and/or from plug-in installers (116). The user launches the media composition application (118), which causes the set-up procedure to execute (120). This procedure is discussed below in connection with FIGS. 3A and 3B. The user then wishes to create a master clip to be used as part of a media composition and identifies a volume or a feeder type associated with the master clip (122). The format-handling subsystem extracts a resolvable handle as well as metadata via the identified feeder, sends the information to a format plug-in handler within a source database of the media composition application, which creates the master clip (124) and writes the resolvable handle as well as the metadata into the master clip entry in the database. The master clip uses the source ID and timecode metadata associated with the content being received through a feeder to group multiple essence feeds to their common source. Optionally, the master clip is connected to a media player (126) if, for example the user places a representation of the master clip, onto a timeline or a mixer for the media composition. A media player is an application that provides an audible or visual output of audio or video samples. This then invokes bitstream and codec plug-ins which are able to read media (audio samples or video frames) from one or more feeders through which the essence is received (128). The media is played back (audio) or displayed (video) or written to disk in a file format defined by the media composition application (130). The playback or writing of the media samples invokes the bitstream or codec (encoder/decoder) plug-ins.

Figure 2A:
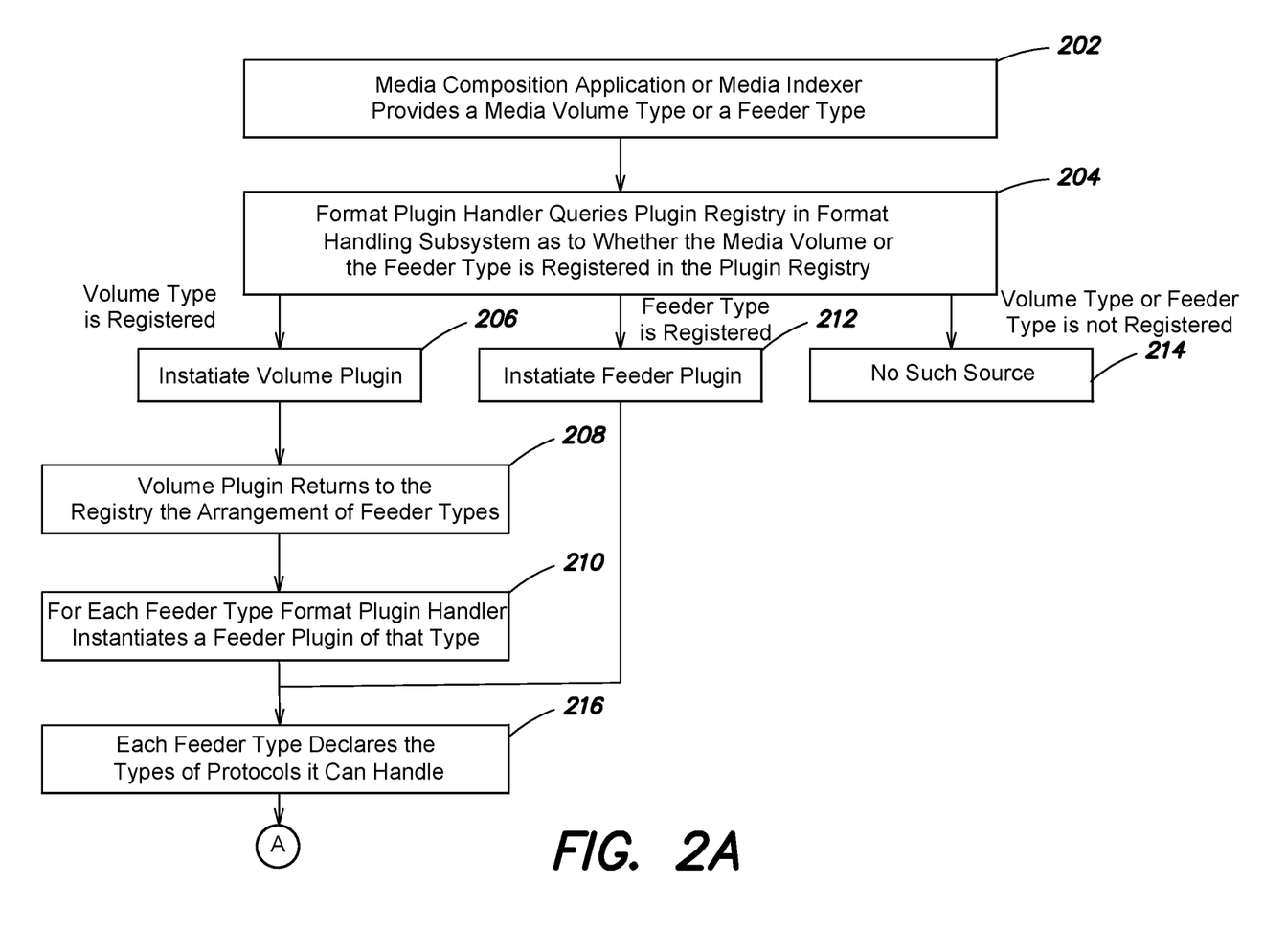
FIGS. 2A and 2B are flow diagrams showing a set-up procedure in which plug-ins required to identify, index, and access each feeder type are instantiated by a media indexer or media composition application.
Figure 2B:
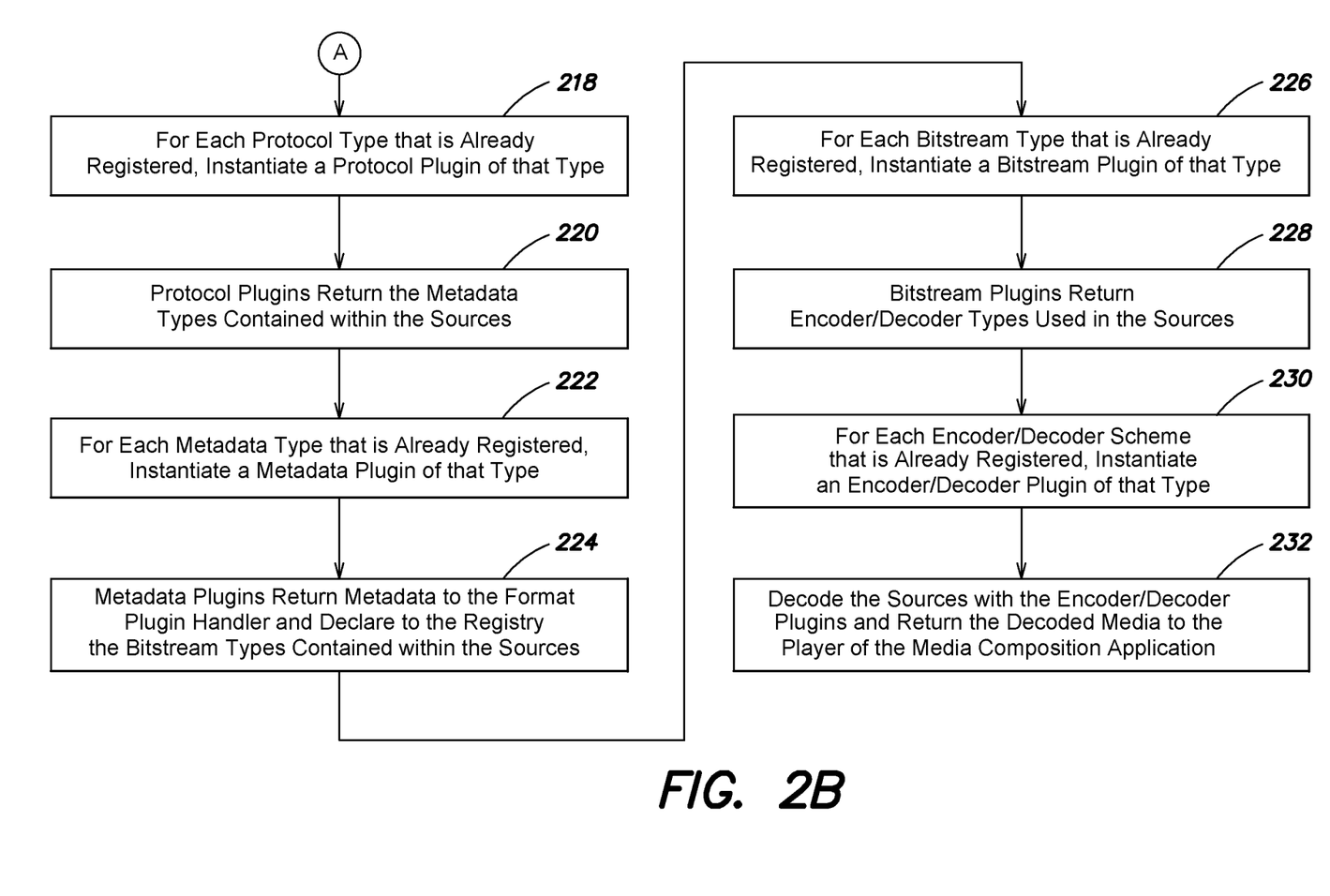

The set-up procedure by which the various plug-ins that are required are instantiated by the media indexer (FIG. 1B, 106) or by the media composition application (FIG. 1A, 120) is illustrated in the flow diagrams of FIGS. 2A and 2B. The components of the media composition application and a media indexer which perform the various actions are shown in FIGS. 3A, 3B, 4A, and 4B respectively, which are described below. The set-up process involves a chain of plug-in instantiations, starting at the volume or feeder level, proceeding through protocol, metadata, bitstream, and codec levels. Each volume may contain multiple feeder types, each of which may contain multiple protocols, each with one or more metadata types and bitstream types. The end result of the chain of plug-in instantiation is that the media composition application or media indexer is able to obtain all the required metadata about the available sources, to determine whether each of the source's media is available for playback, and to determine the quality of the media. The steps involved in this process are described next in more detail.

The process begins with the provision by the media indexer or by the media composition application of a media volume type or, if no volume is involved, a feeder type (202). A volume consists of a logical grouping of feeders. In one example of a volume organization, the video may be present on an SDI port, the audio on an IP port (e.g., as AVB), and the metadata may be in a file. In another example, the video may be received over an IP port, the audio from a file, and a high-resolution video over SDI. The user may also specify the content to be represented by the media. The format plug-in handler, a module within the media composition application, queries the plug-in registry in the format-handling subsystem of the media composition application as to whether the provided media volume or feeder type is registered in the plug-in registry (204). If a volume is provided and it is registered, the corresponding volume plug-in is instantiated (206), and the volume plug-in returns to the registry the arrangement of feeder types (208), and for each of the feeder types, the format plug-in handler instantiates a feeder plug-in of that type (210). If, no volume is involved and the media composition application or media indexer provided a feeder type that is registered in the registry, the corresponding feeder plug-in is instantiated (212). If the provided volume or feeder is not registered, the system indicates that no such source is present (214).

Volume metadata identifies the location of particular channels within the media content being received through the various feeders, which feeder, e.g., SDI, IP, or file, is associated with what channel, or how to locate more than one channel within the data coming through the same feeder. The volume plug-in obtains its information from a configuration file, or the information is encapsulated in the logic of the volume plug-in. The information is usually specified by a manufacturer, such as a video camera manufacturer or even the manufacturer of the composition application. As an alternative to specifying the channel information with metadata in situations where the channel configuration is constant, the channel organization may be specified as the element type in a volume manifest, as described next. Use cases in which the channel configuration is defined in a volume manifest include: (i) a camera volume type in which a recording stores the left and right channels in two separate files which are labelled as such, such that when a volume plug-in is instantiated, the system always expects left and right channels in a particular location; and (ii) when using RCA cables with audio, the left and right channels are always in a predefined location. By contrast, a metadata-defined channel configuration may be used when streaming, in which case the metadata specifies which channel is represented by an IP stream. The configuration may be determined at the protocol level. For example, if a source uses a SMPTE 2110 protocol, one of the streams contains video, a second stream contains audio, and a third contains ancillary data.

A volume plug-in returns a manifest that is a list of each of the feeders within a volume, each feeder represented by its feeder type, its handle, its element type, and an optional label. Feeders include but are not limited to the following types:

| Feeder Type | Handle Type |
| --- | --- |
| SDI | port 1, 2, 3, or 4 |
| IP | virtual port number 8080 |
| File system | file path |

-continued

| Feeder Type | Handle Type |
| --- | --- |
| USB | port 1, 2 . . . |
| API | API endpoint |
| HTTP resource | URI or URL |
| FTP | URL or URI |

For a volume having n channels, the manifest returned by the volume plug-in is a list of the following form:

[(Feeder $Type_1$, $Handle_1$, Element $Type_1$, Optional $Label_1$);

(Feeder $Type_2$, $Handle_2$, Element $Type_2$, Optional $Label_2$);

. . . .

(Feeder $Type_n$, $Handle_n$, Element $Type_n$, Optional $Label_n$)].

Handles for each of the feeder types are illustrated in FIGS. 3A, 3B, 4A, and 4B and are described below. A given source may be received from different external devices having different feeder types. For example, a single video source may include multiple video channels all of which are on a single SDI spigot or which are spread across multiple spigots. The element types describe the type of media content, e.g., whether it is a video, audio, ancillary data, graphics payload, metadata, and dynamic metadata. The optional labels in the manifest specify a role that essence received via the feeder plays with respect to other essence types when consumed by the application. For example, video label might specify that an element is a left or a right channel in a stereoscopic pair, or it may specify a temporal span, such as the first half or the second half of a video channel, or the quality of the video, or whether it is R, G, B, or a video and alpha channel.

A different feeder plug-in is instantiated for each of the elements in the volume manifest. The feeder plug-in establishes a connection to the feeder corresponding to its type, resolves the handle provided by the corresponding entry in the volume manifest, and determines the protocols that can be handled by the feeder type and that may be required to read the information being received via the feeder. The feeder plug-in returns the required protocols to the registry (216). This information is obtained by the feeder plug-in by contacting the connected source or device and interrogating it to obtain the required protocol, or by other means, such from data hard-coded within the plug-in, or loading the information from a configuration file. In some cases, the feeder type can intrinsically determine what protocol plug-ins are required. In addition, the feeder plug-in may issue a query to the user to specify the protocol or use a default protocol. More than one protocol may be required for certain feeders, such as when audio, video, and metadata are all provided in the same stream, each having its own protocol.

The following table provides examples of the types of protocol corresponding to each of the feeder types.

| Feeder | Protocol |
| --- | --- |
| SDI | SMPTE 372M |
|  | SMPTE 259M |
|  | SMPTE 292M |

-continued

| Feeder | Protocol |
|---|---|
| IP | SMPE 2110 |
| | AES 67 |
| | SRT |
| | AVB |
| | NDI |
| File System | File path to: |
| | MOV |
| | MP4 |
| | MP3 |
| | MXF |
| | Bwav |
| | xml |
| | ALE |
| USB | USB1 |
| | USB2 |
| | USB3 |
| | Camera Data Handler |
| | Audio Data Handler |
| Thunderbolt | AVB |
| | Displayport Vx.x |
| API | S3 |
| | Azure Blob |
| HTTP | MPEG-DASH |
| | To MP4 |
| | To MPEG-2 |
| | HLS |
| | to MP4 |
| | To fMP4 |
| FTP | Media File URL to MOV |
| | To MP4 |
| | To MP3 |
| | To MXF |

When a feeder plug-in has determined the one or more protocols used by its corresponding source, the indexer queries the plug-in registry to see if plug-ins for each of the required protocols are registered and instantiates those that are registered (218). If a protocol is not registered, the system will return an "unknown protocol" message.

The role of the protocol plug-in is to parse the data payload associated with the feeder to locate the metadata and the media essence bitstreams. In some cases, the protocol implies the structural locations of the bitstreams; in other cases, the protocol plug-in reads structural metadata contained within the data supplied by the feeder which defines how the bitstreams are structured, enabling the plug-in to return a location within the overall data payload as to where the various element types are located and the type of bitstream each of these element types have. The metadata types present within the feeder are returned to the registry (220).

If, for a particular protocol, there is a metadata encoding in addition to the media essence encoding, the encoding type for the metadata is passed to the plug-in registry by the protocol plug-in. As with the other types of plug-in, the registry is first consulted as to whether a metadata plug-in of the appropriate type is registered, and if it is, the metadata plug-in is instantiated (222). The metadata plug-in handles the information about the feeder and the content coming through the feeder and writes the metadata into the source database of the media composition application or the media indexer. The metadata may include structural metadata, such as that specifying the channel labeling of the content coming through the feeder, quality descriptors, technical metadata, the encoding type, the synchronization type, and descriptive metadata, such as the nature of the content. The following table provides examples of protocol types and the types of standard metadata formats that may be present in the corresponding source.

| Protocol | Metadata |
|---|---|
| SDI-SMPTE259M | SMPTE291M |
| SDI-SMPTE292M | Vertical Blanking |
| IP-SMPTE2210 | SMPTE-291M |
| | --40 |
| File-BWAV | aXML |
| | iXML |
| | XMP |
| File-MXF | SMPTE-377M |
| | SMPTE-RDD9 |
| File-ALE | ALE |
| | CDL |
| FTP-MXF | SMPTE-377M |
| | SMPTE-RDD9 |
| FTP-BWAV | aXML |
| | iXML |
| | XMP |
| FTP-ALE | ALE |
| | CDL |

The quality of the media essence being received via a particular feeder may be specified explicitly within the technical metadata within the feeder's payload. In some cases, the quality is directly implied by or defined by the protocol or feeder type, in which case the metadata plug-in "translates" the implication as to the quality into an explicit quality parameter that is returned. In certain other cases, the metadata plug-in makes an API call to an external location to obtain metadata containing the quality information. In this latter case, the quality information is neither contained in the feeder payload, nor is it implied by the protocol or feeder type. Media essence quality information is needed by a user of the media composition application in order to select the indexed content associated with that quality corresponding to the appropriate feeder for the task at hand. Alternatively, it may be used by the media composition application to automatically select the indexed content and corresponding feeder associated with that quality. Examples of media quality specified by technical metadata in the feeder payload include a 6K or 8K resolution of file-based essence containing an original high-resolution camera quality or an IP SRT stream carrying a reduced resolution proxy quality. An example of an implied quality arises with a 1.5G SDI feeder, which implies an HD resolution since a single 1.5 SDI port is typically used to carry HD quality material as opposed to 6K or 8K. In this case, the metadata plug-in programmatically returns the feeder quality as HD without having to query the connected source without having to depend on any other external factors.

The media quality information provided to the media indexer may include metadata specifying the encoding type, the resolution, the bit depth, the color model, the subsampling scheme, and the sample rate. In addition, it may include information about the subject matter represented by the media. This metadata is also made available for media searching, thus supplementing a search based only on quality matching. When dealing with media streams, the source quality information includes the transport protocol used by the stream. With this information, a plug-in specific to the stream format is instantiated, such as a plug-in for the SRT, RTMP, or NDI protocol, and the instantiated plug-in is then able to access the media quality information and read media samples, if they are available.

Metadata returned by the protocol plug-in includes information as to the type of media essence, encoding, and synchronization that is present within the feeder, which is used to determine what bitstream plug-in is needed in order to read the data (224). The media indexer then proceeds to check the registry as to whether a bitstream plug-in of the required kind is registered, and if it is, the required bitstream plug-in is instantiated (226).

The following table lists examples of the types of bitstream that may be present in feeders having the enumerated protocols.

| Protocol | Bitstream |
|---|---|
| IP-SMPTE-2022-2/3 | MPEG-2 Transport Stream |
| File-AVI | |
| File-MOV | |
| File-MP4 | |
| HTTP HLS | |
| HTTP MPEG-DASH | |
| File-MXF | RP2019-2-2009 VC-3 Bitstream |
| File-MOV | AES3 |
| IP-AVB | AVTP-HC32, AVTP-HC24 |

The role of the bitstream plug-in is to handle the parsing of the stream of data and to index the frames and the media samples. It also determines the way in which the information is packed, which enables it to determine the encoding scheme deployed, and therefore to specify the encoding/decoding plug-in required to read the media essence received through the feeder (228). For each encoder/decoder type that is not already instantiated, a corresponding plug-in is instantiated (230). The encoder/decoder plug-in handles the encoding and decoding of the individual frames and samples, performing any required decompression, compression or transcoding, and sends the decoded media to the player of the media composition application (232).

We now describe a system for performing context-based media indexing of the various source contexts and source types that may be indexed, and therefore made directly available to a media composition application. The techniques described herein may also be applied to further media source contexts and types that are not described herein. In certain embodiments, context-based media indexing may be performed by entirely by a format-handling subsystem 314 incorporated within a media composition application, as illustrated in FIG. 3A. In other embodiments, context-based media indexing is implemented on a separate system that hosts a media indexing service, as described below and illustrated in FIG. 4B. The former architecture is suitable for a single media composition application operating on its own which therefore needs to create its own source database, while the latter may be advantageous when there are multiple editors each with their own media composition application and source databases that draw upon a shared indexing service, which avoids duplication of the indexing operation.

FIGS. 3A and 3B are high-level block diagrams showing the various components of a media composition application using the described context-based media indexing methods with a range of external media devices that act as media sources. Computer 302 hosts media composition application 304. The media composition application includes source database 306, which contains format plug-in handler 308, and is populated by master clips, such as master clip 310. It also includes media player 312. The various media sources are handled by format-handling sub-system 314, which contains plug-in registry 316, and instantiated versions of the various plug-ins required to handle the range of sources to which the media composition application has access. As described above, these plug-ins communicate with the host application via APIs, and include volume plug-in 318, feeder plug-in 320, protocol plug-in 322, metadata plug-in 324, bitstream plug-in 326, and encoder/decoder plug-in 328. The arrows in the figure indicate the flow of information between the plug-ins via their APIs to format plug-in handler 308 of source database 306. Information in the form of decoded media is also provided to media player 312 from encoder/decoder plug-in 328.

Format-handling subsystem 314 accesses external media devices 330 by means of feeder handles 332, which provide the specific location or index details required to access a specific instance of a corresponding feeder and the content therein. The feeder handles generally comprise software that interfaces with hardware. External media source devices may include but are not limited to the examples illustrated in FIG. 3B. Camera 334 generates an SDI output, which is connected to and SDI feeder instance, which is represented by an SDI port number, i.e., handle 336. The camera may also output an IP stream onto wide area network 338, which is connected to IP handle 340. The camera may also output a file which is stored on file storage 342, which is accessed using file system handle 344 consisting of a file path or an operating-system-defined file handle. Similarly, external device 346, such as a tape deck, is accessed via USB port with a port number acting as handle 348. Objects in blob storage 350 are accessed through an API endpoint using an object ID acting as handle 352. Cloud storage 354 is accessed via HTTP endpoint using URI handle 356. Remote FTP server 358 is accessed via an FTP service using a URL or a file path as handle 360. The handles may include a hardware component. For example, SDI handle 128 includes an SDI card, IP handle 130 includes a network interface controller, file system handle 132 may include a network interface card, a fiber channel controller, or a storage controller, USB handle 134 requires a hardware USB controller, and API handle 136 and HTTP resource handle 138 require a network interface card. The media composition application continuously monitors the external sources using source monitoring module 362 to keep source database 306 updated with changes in the content of sources and/or changes in source availability.

Figure 4A:
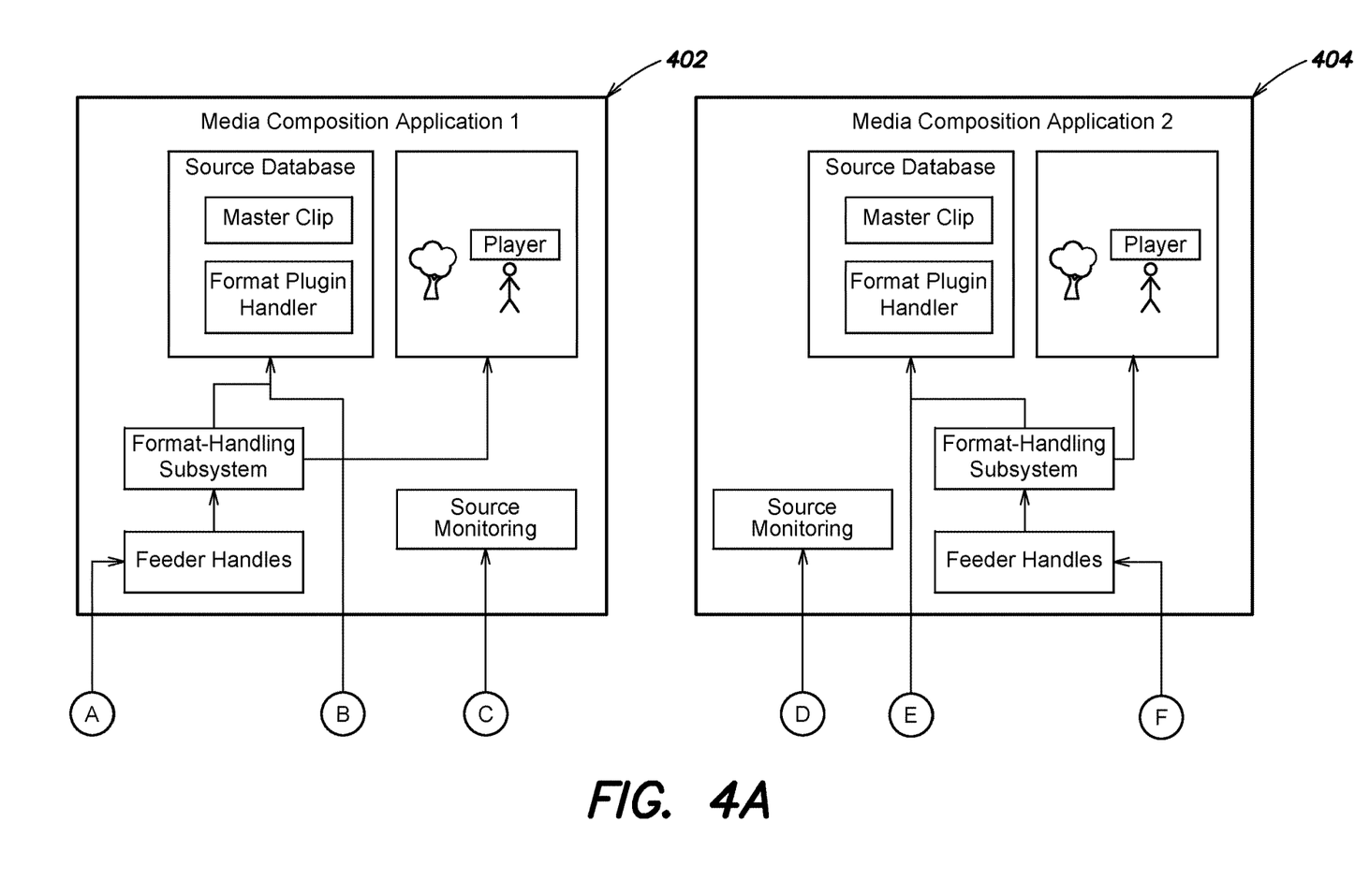
FIGS. 4A and 4B are high-level block diagrams showing components of a media indexer providing a context-based media indexing service to two media composition applications using the described context-based media indexing methods with a range of external media devices that act as media sources.
Figure 4B:
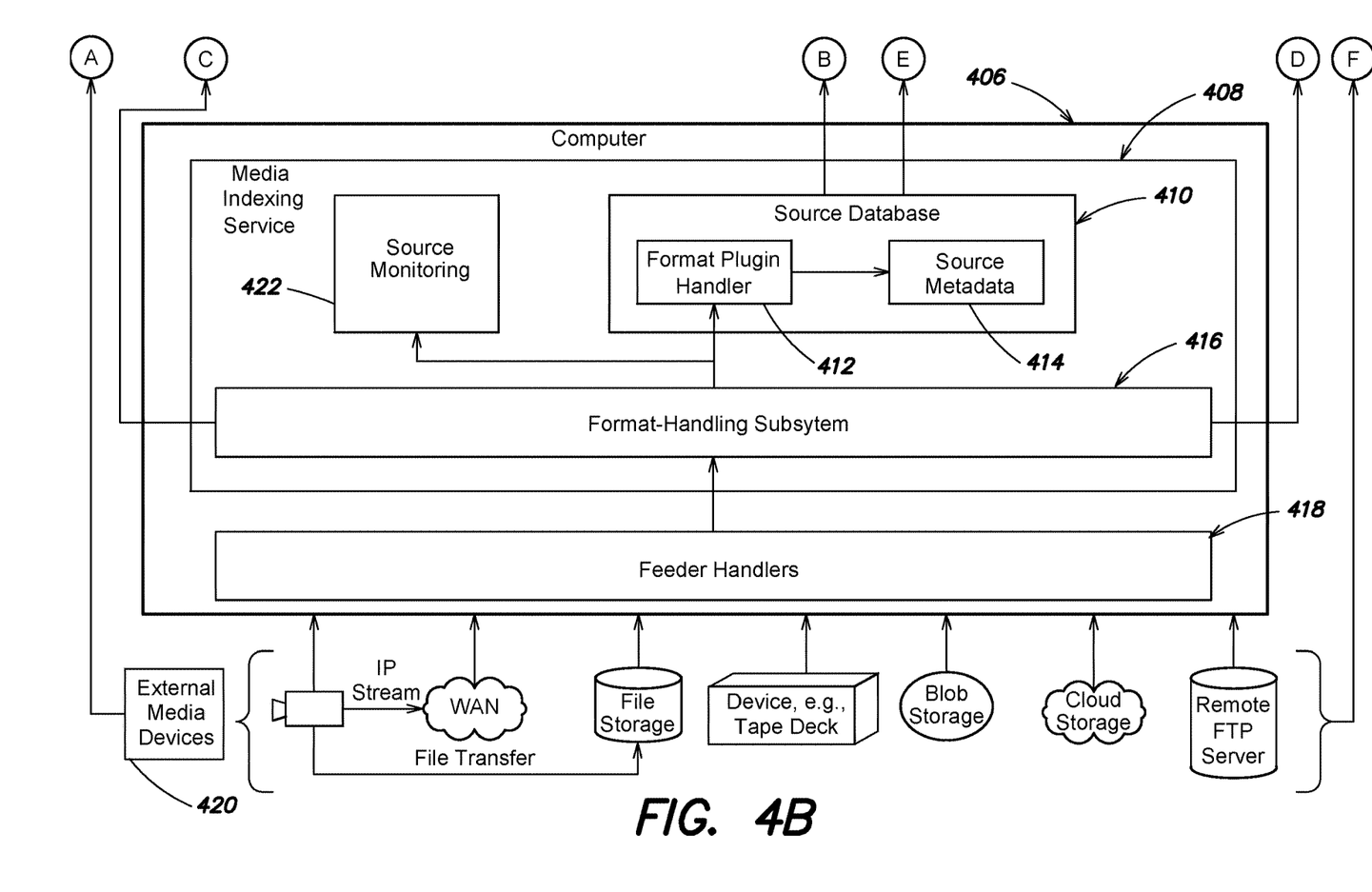

FIGS. 4A and 4B are high-level block diagrams showing the various components of a media indexing service that provides context-based media indexing service to two media composition applications using the described context-based media indexing methods with a range of external media devices from which media is received. The media indexing service provides the ongoing indexing and access to the range of external media devices during the course of the media composition process taking place with one or more media composition applications, as shown in steps 102-114 of FIG. 1B.

Referring to FIG. 4A, each of media composition application 1 402 media composition application 2 404 include a source database and media player, as well as feeder handles and a format-handling subsystem, each of which is shown in more detail for media composition application 304 in FIG. 3A. The computer systems hosting the media composition applications are not shown in the figure. Computer system 406 hosts media indexer 408. The media indexer includes its own source database 410, which contains format plug-in handler 412 and source metadata 414. It also includes format-handling sub-system 416, which contains the plug-in registry and set of plug-ins that are illustrated in FIG. 3A for the media composition's format-handling sub-system 314. The media indexer also includes set of feeder handles 418, which is shown in more detail in FIG. 3B, 332. External devices 420 are connected both to their corresponding feeder handles 418 in the media indexer as well as to the feeder handles in the media composition applications. The media composition application obtains from the media indexer the master clip information to resolve the source of data corresponding to a particular quality but uses its direct connection to the external media devices to extract the bitstream and decode the media samples. The media indexer continuously monitors the external sources (FIG. 1B, 114) using source monitoring module 422 to keep source database 410 updated when source content or availability changes. Similarly, source monitoring modules within the media composition applications serviced by the media indexer also monitor the external sources to keep their own source databases updated. Upon user request, the updated source metadata may be accessed by the media composition applications (FIG. 1B, 122) and additional master clips are added to the source database of the media composition applications. If a master clip representing source content is connected to a media player (FIG. 1A, 126), the bitstream and codec plug-ins are invoked by the format-handling sub-system of the media composition application (FIG. 1A, 128) and displayed or played back on the media player or written to disk (FIG. 1A, 130).

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of accessing a media source the method comprising:
   receiving a specification of a feeder of a first type over which media essence is to be received, wherein the first type is not a file type;
   performing an application program interface (API) call to a software plug-in module adapted to an attribute of a data stream to be received via the feeder of the first type; and wherein:
      the software plug-in module returns a handle to a media composition application; and
      the media composition application uses the handle to access via the feeder of the first type at least one of media essence from the media source, metadata pertaining to the media essence, and metadata pertaining to the media source.

2. The method of claim 1, wherein the metadata defines a technical quality of the media essence to be received via the feeder of the first type.

3. The method of claim 2, wherein the metadata specifies a type of media essence, a synchronization, and an encoding type, and further comprising:
   executing a bitstream plug-in software module that:
      parses a stream of data received from the feeder of the first type;

indexes at least one of video frames, audio samples, ancillary data and metadata present within the stream of data;

determines a decoding method; and executing a decoding plug-in software module corresponding to the determined decoding method, wherein the decoding plug-in software module:

decodes the at least one of the video frames, audio samples, ancillary data and metadata present within the stream of data; and sends the decoded at least one of the video frames, audio samples, and ancillary data to a media player of the media composition application.

4. The method of claim 1, further comprising storing the handle as a media source entry in a database of media sources available to the media composition application.

5. The method of claim 4, wherein the database of media sources is stored by a media indexing service.

6. The method of claim 4, wherein the database of media sources is stored by the media composition application.

7. The method of claim 4, wherein the database of media sources includes a given media source representing a given content that is available in a plurality of different technical qualities.

8. The method of claim 7, wherein the given media source is available in a first technical quality via a feeder of a first type and in a second technical quality different from the first technical quality via a feeder of a second type.

9. The method of claim 1, wherein the attribute of the data stream to be received via the feeder of the first type is at least one of a protocol type deployed by the data stream, a metadata type contained within the data stream, and a channel type present within the data stream.

10. The method of claim 1, wherein the first type is one of an SDI feeder type, an IP feeder type, a USB feeder type, a blob storage feeder type, a cloud storage feeder type, and a remote FTP server feeder type.

11. The method of claim 1, wherein the feeder of the first type is an HTTP endpoint and the handle is one of a uniform resource identifier and a uniform resource locator.

12. The method of claim 1, further comprising:

in response to receiving the specification of the feeder of first type:

locating in a plug-in registry of the media composition application an entry corresponding to the feeder of the first type; and using information contained within the entry to instantiate and execute a copy of a feeder plug-in of the first type.

13. The method of claim 1, further comprising:

in response to launching a media indexing service:

populating a registry within a format-handling subsystem of the media indexing service with a set of feeder types over which media source metadata and media essence may be received; and receiving and instantiating a copy of a software plug-in module corresponding to each feeder type of the set of feeder types.

14. The method of claim 1, wherein the data stream to be received via the feeder of the first type is not yet available.

15. A method of indexing a media source the method comprising:

receiving a specification of a feeder of a first type over which media essence is to be received, wherein the first type is not a file type;

performing an API call to a software plug-in module adapted to an attribute of a data stream to be received via the feeder of the first type; and wherein:

the software plug-in module returns a handle to a media indexing service; and the handle enables the media indexing service to access the feeder of the first type to obtain at least one of metadata pertaining to the media source and metadata pertaining to the media essence to be received from the media source.

16. The method of claim 15, wherein the media indexing service passes to a media composition application the specification of the feeder of the first type and the at least one of the metadata pertaining to the media source and the metadata pertaining to the media essence to be received.

17. The method of claim 15, wherein the metadata defines a technical quality of the media essence to be received via the feeder of the first type.

18. The method of claim 15, wherein the metadata specifies a type of media essence, a synchronization, and an encoding type.

19. The method of claim 15, wherein the media source is available in a first technical quality via a feeder of a first type and in a second technical quality different from the first technical quality via a feeder of a second type.

20. The method of claim 15, wherein the attribute of the data stream to be received via the feeder of the first type is at least one of a protocol type deployed by the data stream, a metadata type contained within the data stream, and a channel type present within the data stream.

21. The method of claim 15, wherein the feeder of the first type is one of an SDI feeder type, an IP feeder type, a USB feeder type, a blob storage feeder type, a cloud storage feeder type, and a remote FTP server feeder type.

22. The method of claim 15, wherein the feeder of the first type is an HTTP endpoint, and the handle is one of a uniform resource identifier and a uniform resource locator.

23. The method of claim 15, further comprising:

when the media indexing service is launched:

populating a registry within a format-handling subsystem of the media indexing service with a set of feeder types over which media source metadata and media essence may be received; and receiving and instantiating a copy of a software plug-in module corresponding to each feeder type of the set of feeder types.

24. The method of claim 15, wherein the data stream to be received via the feeder of the first type is not yet available.

* * * * *